(12) United States Patent
Schoonover

(10) Patent No.: US 6,854,542 B2
(45) Date of Patent: Feb. 15, 2005

(54) MOTORCYCLE V-TWIN ENGINE HEAT DEFLECTOR

(76) Inventor: Robert J. Schoonover, 212-A S. Carolina Ave., Wilmington, NC (US) 28401

( * ) Notice: Subject to any disclaimer, the term of this patent is extended or adjusted under 35 U.S.C. 154(b) by 0 days.

(21) Appl. No.: 10/225,044

(22) Filed: Aug. 20, 2002

(65) Prior Publication Data

US 2004/0035619 A1 Feb. 26, 2004

(51) Int. Cl.$^7$ ............................................. B60K 11/00
(52) U.S. Cl. ...................... 180/68.2; 180/219; 180/229
(58) Field of Search ................................ 180/68.1, 225, 180/296, 299, 89.1, 89.2, 68.2, 229, 219; 280/288.4, 219, 304.4, 304.3, 304.5, 229, 152.2; 296/180.1

(56) References Cited

U.S. PATENT DOCUMENTS

| | | | |
|---|---|---|---|
| 1,430,938 A | 10/1922 | Calvignac | |
| 2,330,341 A | 9/1943 | DuPont et al. | 180/35 |
| 3,756,623 A | 9/1973 | Whittler | 280/289 |
| 3,927,727 A | 12/1975 | Hanagan | 180/30 |
| 4,157,739 A | 6/1979 | Frye | 180/33 R |
| 4,191,269 A | 3/1980 | Nagashima et al. | 180/217 |
| D258,126 S | 2/1981 | Taylor | D12/114 |
| 4,334,589 A | 6/1982 | Asakura et al. | 180/219 |
| 4,411,333 A | 10/1983 | Bothwell | 180/219 |
| 4,413,700 A | 11/1983 | Shiratsuchi | 180/219 |
| 4,457,524 A | 7/1984 | Yoshiwara | 280/5 A |
| 4,457,552 A * | 7/1984 | Katsuoka | 296/180.1 |
| 4,506,754 A | 3/1985 | Hirano et al. | 180/219 |
| 4,650,204 A * | 3/1987 | Bothwell | 280/304.3 |
| 4,678,223 A | 7/1987 | Kishi et al. | 296/78.1 |
| 4,685,530 A * | 8/1987 | Hara | 180/219 |
| 4,735,278 A * | 4/1988 | Komuro et al. | 180/229 |
| 4,762,197 A * | 8/1988 | Yamada et al. | 180/219 |
| 4,830,135 A * | 5/1989 | Yamashita | 180/229 |
| 4,955,193 A | 9/1990 | Hoeptner, III | 60/320 |
| 4,964,484 A | 10/1990 | Buell | 190/219 |
| D312,060 S | 11/1990 | Matsuzawa et al. | D12/110 |
| 5,016,725 A | 5/1991 | Muramatsu | 180/225 |
| 5,040,632 A * | 8/1991 | Fujii et al. | 180/219 |
| 5,109,942 A * | 5/1992 | Akimori et al. | 180/219 |
| 5,183,130 A * | 2/1993 | Nakamura et al. | 180/219 |
| 5,199,395 A * | 4/1993 | Mizumura et al. | 123/196 AB |
| 5,323,869 A * | 6/1994 | Kurayoshi et al. | 180/219 |
| 6,026,930 A * | 2/2000 | Ogisu et al. | 181/228 |
| 6,073,948 A * | 6/2000 | Motojima et al. | 280/152.2 |
| 6,102,149 A * | 8/2000 | Suzuki et al. | 180/229 |
| 6,179,313 B1 | 1/2001 | Christensen | 280/219 |
| 6,591,930 B2 * | 7/2003 | Coughlin et al. | 180/219 |
| 6,622,806 B1 * | 9/2003 | Matsuura | 180/68.1 |

* cited by examiner

Primary Examiner—Hau Phan
(74) Attorney, Agent, or Firm—Michael E. Mauney

(57) ABSTRACT

A heat deflector for a Harley-Davidson™ v-twin engine motorcycle or a similarly designed and styled motorcycle having a similar v-twin engine. The heat deflector is mounted above the rear cylinder of the v-twin engine and between the leg of a user and the rear cylinder of the v-twin engine. The heat deflector deflects hot air away from the leg of the user and away from saddlebags that may be mounted behind the leg of the user bilaterally on the rear wheel of the motorcycle. The heat deflector provides greater comfort for a user on a long distance drive. It is constructed to blend seemlessly with the appearance of the motorcycle and it reduces condensation in saddlebags. The heat deflector of this invention provides much of the comfort of an alternative designed motorcycle with a fairing enclosing the engine while retaining the distinctive appearance of the Harley-Davidson™ or a Harley-Davidson™ type v-twin engine motorcycle.

8 Claims, 3 Drawing Sheets

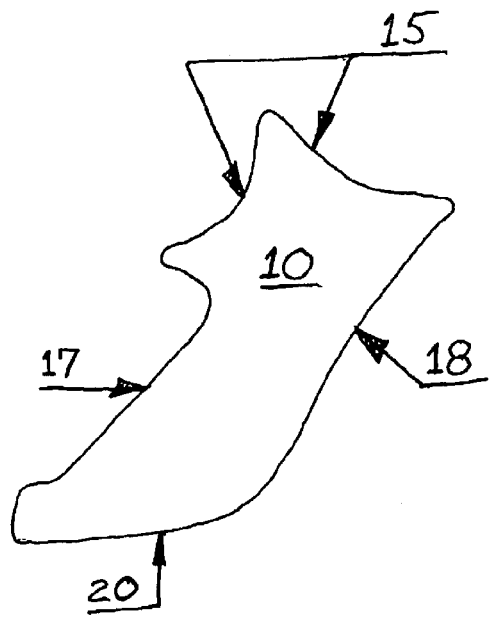
FIGURE 1A
FIGURE 1C
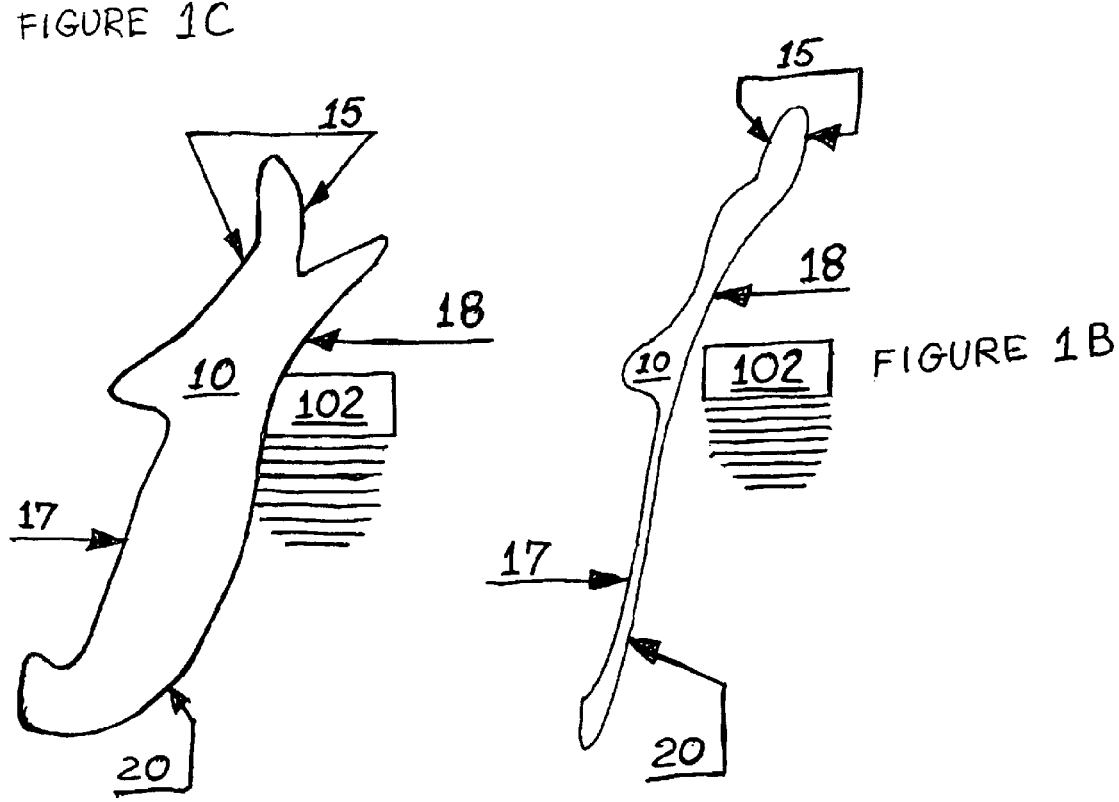
FIGURE 1B

1

MOTORCYCLE V-TWIN ENGINE HEAT DEFLECTOR

FIELD OF THE INVENTION

This invention relates generally to a heat deflector to go on a particular type of motorcycle engine. It serves as a heat deflector for a driver of the vehicle, but also diverts heat away from storage areas or saddlebag's customary mounting point on a motorcycle.

BACKGROUND OF THE INVENTION

Motorcycles could be defined as a two-wheeled, gasoline powered open vehicle. Typically, the wheels are mounted on a frame. The front wheel is controlled by handlebars mounted approximately above or somewhat behind the front wheel. The front wheel pivots on forks mounted on an axle, with the pivoting motion controlled by the handlebars or similar device used by a rider to control the turning of the front wheel. The rear wheel is separated from the front wheel by a frame. The rear wheel is typically fixed in the frame and is the drive wheel. The engine is ordinarily mounted between the front wheel and rear wheel. The gasoline tank is above the engine with the seat mounted between the engine and the rear wheel behind the gas tank. Ordinarily, there is a single seat although the seat may be extended in such a fashion as to allow a passenger to sit behind the driver.

In the United States at least, a motorcycle is not a utilitarian vehicle. It is open and exposed to the elements in a way that an enclosed vehicle like a car is not. Because it is an open vehicle, such safety devices as air bags, seat belts, roll bars and the like are not available, hence, it is more dangerous in an accident.

There are a number of manufacturers who build and sell motorcycles. Among the better known manufacturers are Honda™, BMW™, and Harley-Davidson™. Of these, Harley-Davidson™ is known throughout the world for the particular type of motorcycle it builds and sells and for the cachet that accompanies this motorcycle. Whether rightly or wrongly, Harley-Davidson™ is known for a rebel image commonly associated with particular types of motorcycles. This is in contrast, for example, to Honda™, which has tried to distance itself from the black leather motorcycle gang image that sometimes accompanies the marketing of the Harley-Davidson™.

Perhaps the defining feature of the characteristic Harley™ motorcycle is the large V-twin common crank pin engine, which has been part of the Harley™ design for at least a half a century. It is the throaty growl associated with this type of engine for which Harley-Davidson™ has sought a trademark. The large torque and fast acceleration are characteristics of this engine and are commonly thought of as characteristics of the Harley-Davidson™ motorcycle. This air-cooled engine has two large cylinders arranged in a V. The plane formed by the V is parallel to a plane bisecting the wheels of the motorcycle in a lengthwise direction. This air-cooled V-twin engine generates a great deal of heat. Other motorcycle brands have copied the Harley configuration including the large V-twin engine as a means of competing with Harley™ and, more specifically, capturing the cachet that accompanies the Harley™ V-twin engine and its throaty growl.

Purchasers of the Harley™ V-twin are not interested in its practicality. Other types of motorcycles with more modern engine designs are arguably more practical than the Harley™ V-twin. Consequently, owners are willing to put up with some inconvenience or even discomfort that may be caused by the Harley™ V-twin design when another engine design would be equally or more efficient at propelling the motorcycle but lacks the romance associated with the Harley™ design. It is toward this specific type of engine and the drawbacks inherent in this design that this invention is directed. It is designed to be a heat deflector to fit onto a Harley-Davidson™ V-twin or a Harley-Davidson™-like V-twin design motorcycle to deflect the heat generated by the V-twin engine away from a user and the saddlebags used on a Harley™. The heat generated by the V-twin engine can cause condensation and water build-up in the saddlebags, hence deflecting the beat away from the saddlebags reduces condensation.

Motorcycles with enclosed running components or fairings enclosing the engine are common, particularly in motorcycles of Japanese designs. For example, Muramatsu, U.S. Pat. No. 5,016,725, Kishi et al., U.S. Pat. No. 4,678,223, Hirano, U.S. Pat. No. 4,506,754, and Asakura et al., U.S. Pat. No. 4,334,589 disclose designs for motorcycles of this type. It is also recognized that the exhaust pipe of the motorcycle may generate substantial heat and it is desirable to shield a rider from burns caused by the heat of a motorcycle exhaust pipe. Hoeptner, U.S. Pat. No. 4,955,193 discloses a series of telescopically constructed semi-annular shield members that fits over the outer side of an exhaust pipe and adjusts by bending to conform to bends in the exhaust pipe and provide a shield for a user of the motorcycle from the heat generated by an engine in an exhaust pipe. Christensen, U.S. Pat. No. 6,179,313 discloses a heat shield to be mounted on or adjacent to a passenger foot rest and extending between the foot rest, hence, the passenger's foot and the exhaust pipe. The Christensen patent is designed to supplement the heat shield ordinarily found on a motorcycle engine exhaust pipe and particularly designed to provide protection for a passenger in a seat located behind the driver.

SUMMARY OF THE INVENTION

This invention is designed to provide a specific type of heat deflector for a Harley-Davidson™ V-twin engine motorcycle (or similar motorcycle having a similar V-twin engine). Purchasers of this type of motorcycle have already made a considerable sacrifice in terms of the utility of the motorcycle in return for the romance that is associated with a V-twin engine motorcycle. Consequently, it is not enough that a heat deflector functions to deflect heat away from a user. There are many alternate motorcycle designs which will do that far better than the heat deflector will do this for a Harley-Davidson™ V-twin type motorcycle. The functionality of the heat deflector must be combined with the overall appearance and cachet of the Harley-Davidson™ V-twin type motorcycle so that the heat deflector does not compromise the desirability associated with this particular design motorcycle. This heat deflector is a generally curvelinear, irregularly shaped malleable piece of heat resistant material. The exact shape may change for the left and right side heat deflector. The upper end of this heat deflector is mounted immediately below the rearward portion of the gas tank. It sits above, over, and slightly to the rear of one of the cylinders on the V-twin engine and, more particularly, the cylinder of the V-twin engine which extends away from the front wheel and is closest to the seat provided for a rider. One edge runs along with and blends into the rectangle seat. The edge of the heat deflector that is closest to the front wheel curves generally downwardly in an elongated S-shape to a point below and adjacent to a side cover commonly found on the Harley-Davidson™ type V-twin engine motorcycle. This heat deflector is constructed of a malleable heat-resistant material. The outer surface will generally be given a leather-like appearance so as to most closely match the appearance of the seat of the motorcycle to which the heat deflector is mounted. Decorative studs or other materials may be mounted along the edges of the motorcycle heat deflector in a way that conforms the appearance of the heat deflector to the appearance of the motorcycle and the particular decorations or decorative options chosen by the owner of that particular motorcycle. When designed and mounted as described, this particular heat deflector serves to deflect heat from the rear cylinder of the V-twin engine away from the rider and the rider's legs and also away from the saddlebags. If the outer surface of the saddlebags become heated, it promotes condensation within the saddlebags as the saddlebags cool. This can result in water accumulating in the bottom of the saddlebags, which is a disadvantage in any storage compartment. Consequently, this heat deflector accomplishes several purposes. First, it is an attractive accessory and blends naturally with and enhances the appearance of the motorcycle. Secondly, it deflects heat away from the legs of the user of a Harley type V-twin motorcycle resulting in a cooler and more comfortable ride, especially on long-distance rides. Third, it deflects heat away from saddlebags that are common accessories on a Harley type V-twin motorcycle. It reduces heating within the saddlebags and eliminates or reduces condensation forming within the saddlebags.

BRIEF DESCRIPTION OF THE DRAWINGS

FIG. 1A is a side view of the right side V-twin heat deflector.

FIG. 1B shows the right side V-twin heat deflector seen from the front.

FIG. 1C shows the right side V-twin heat deflector in perspective with one engine cylinder in view.

DETAILED DESCRIPTION OF THE DRAWINGS

Figure 2:
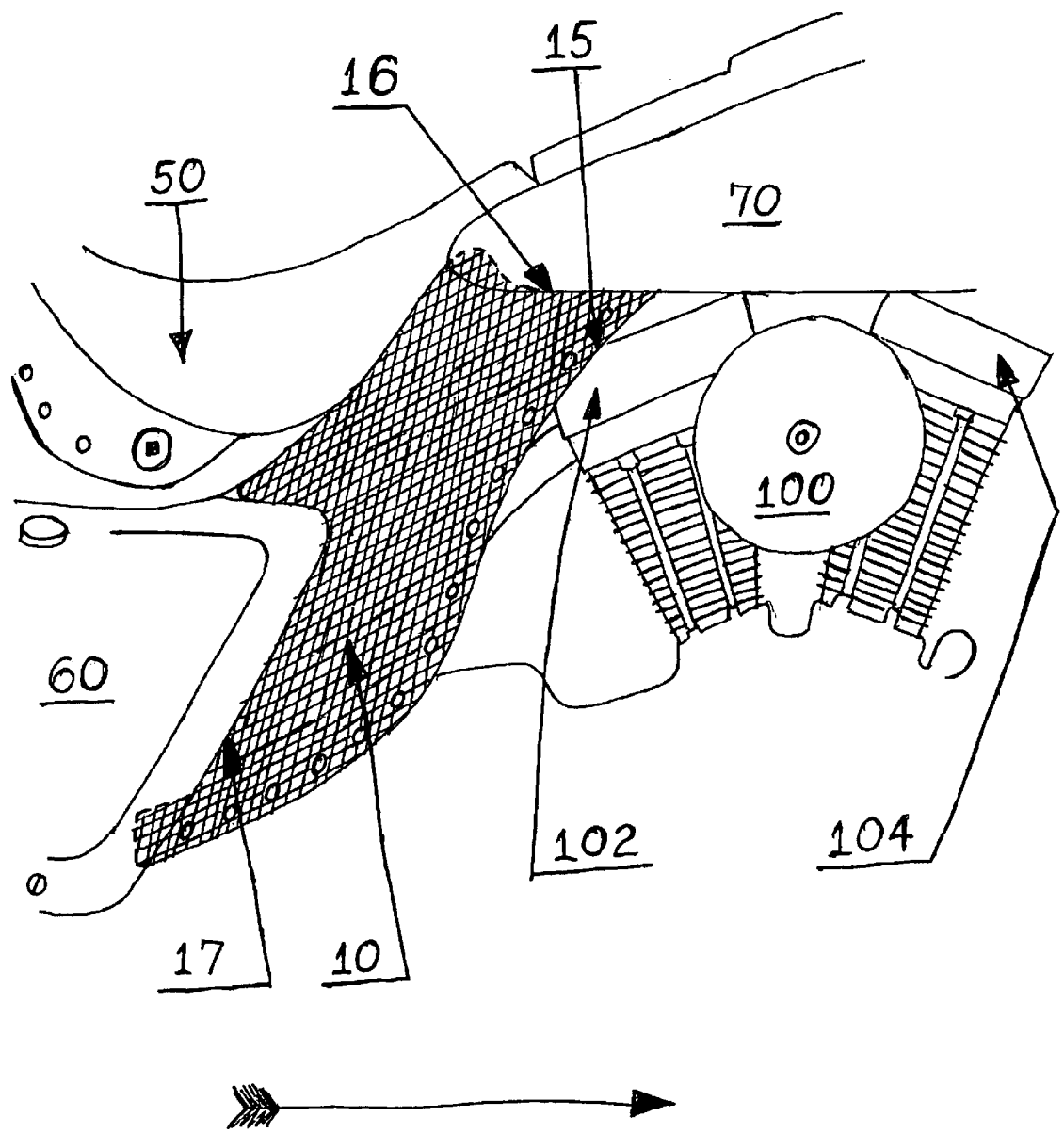
FIG. 2 shows the right side V-twin heat deflector mounted on a V-twin motorcycle.

FIG. 1A is the right side heat deflector (10) as seen from the side. In this view, it is not mounted or connected to a motorcycle. Both the left side and right side V-twin heat deflectors (10 and 10A) are an irregularly shaped, somewhat bowed piece of malleable heat-resistant material. Each outer surface might be covered with a decorative covering like vinyl that appears like leather or other seat covering material. Each could be made of shiny or reflective material or be decorated with studs or brads, painting such as flaming or edge striping, or other decorative motifs. In FIG. 1A, roughly speaking, the right side V-twin heat deflector (10) has an upper outside surface (15) and a lower surface (20). The upper outside surface (15) upper edge ordinarily is positioned adjacent to and immediately below the fuel tank and the seat. The rear edge (17) is adjacent to the oil tank cover. The lower surface (20) from the rear edge (17) extends forward toward the engine and curves or folds upward in a general "S" shape so that the engine edge (18) is over and above the cylinder head on one of the cylinders of the V-twin engine (not shown). FIG. 1B shows the right side V-twin heat deflector (10) as seen from the front and slightly offset so that the shape may be better visualized. Here, the upper portion (15) is shown with a bow or "S" shape or curve. Immediately below the upper portion on the inside surface of the right side V-twin heat deflector (10) is the rear cylinder (102) of the V-twin engine (not shown). The lower surface (20) folds away from the rear cylinder (102) of the V-twin engine. The user's right leg is on the outside of the right side V-twin heat deflector (10) so that the V-twin heat deflector is between a user's leg and the rear cylinder (102). The engine heat is deflected by the right side V-twin heat deflector (10) away from the user's right leg.

FIG. 1C shows from the front perspective the right side V-twin heat deflector (10). Because of the perspective view, it is somewhat foreshortened. From this perspective it can be seen that the rear cylinder (102) is both somewhat below and forward from the right side V-twin heat deflector (10). As will be seen in later views, the direction of travel of the motorcycle causes air to flow from the viewer's right, as seen in FIG. 1C toward the viewer's left. Thus, the right side V-twin heat deflector (10) does not impede air flow to the engine, but rather deflects heated air that is passed over the engine away from the leg of a user, which is positioned both above and outside of the right side V-twin heat deflector (10).

FIG. 2 shows the right side V-twin heat deflector (10) in place on a motorcycle. The motorcycle gas tank (70) is seen above the engine (100), which has two cylinders (102) and (104). The front wheel (not shown) of the motorcycle is located in front of the gas tank (70) and the cylinder (104) in the direction shown by the arrow. The motorcycle right side V-twin heat deflector (10) upper surface (15) is above and covers a portion of the cylinder head for the cylinder (102) of the engine (100). The upper edge (16) runs along with and under the gas tank (70) and along the seat (50). The rear edge (17) runs along with and adjacent to the oil tank side cover (60) with a portion of the rear edge (17) fitting under the oil tank cover (60). As a motorcycle is in progress, air flows along the motorcycle in a direction opposite to the arrow in FIG. 2. It flows over the engine cylinders (102) and (104) and is heated. As it flows over the cylinder (102), it is deflected by the motorcycle right side V-twin heat deflector (10) away from a user's leg. The flaring and shape of the right side heat deflector (10) directs the heat downwardly and away from the saddlebags (not shown) and efficiently channels the heat generated by the engine (100) and the cylinders (102) and (104) in a fashion that leaves the leg of the user unaffected by this heat and also effectively reduces the heat impacting upon the saddlebags (not shown).

Figure 3:
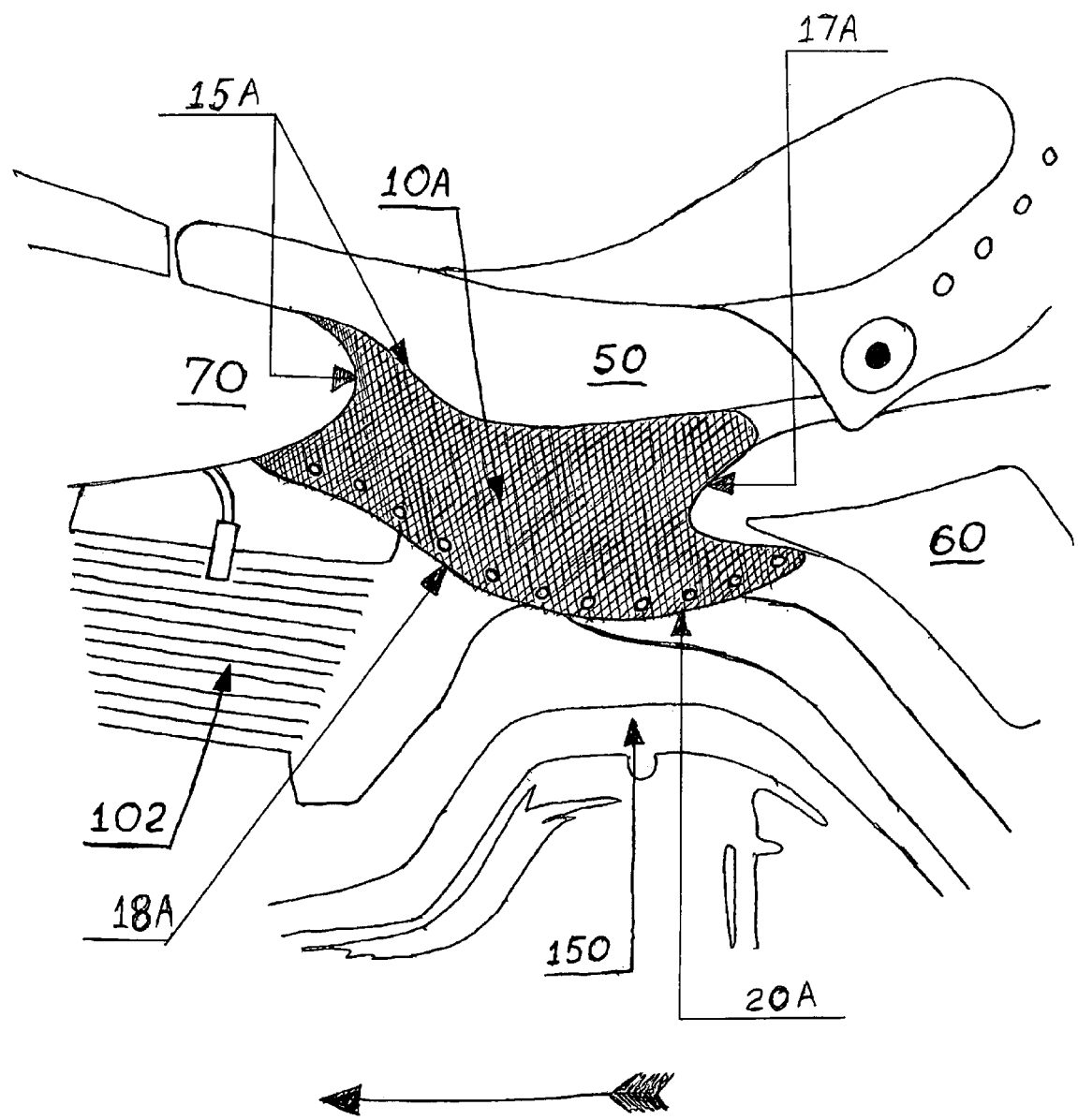
FIG. 3 shows the left side V-twin heat deflector.

The left side heat deflector (10A) is shown in FIG. 3. The front of the motorcycle and the direction of travel of the motorcycle are shown by the arrow at the bottom of FIG. 3. The gas tank (70) is at the left side from the viewer's perspective of FIG. 3. In front of the gas tank, but not shown, would be the front wheel which also steers the motorcycle. Also not shown, but on the extreme right side of the drawing, would be the drive wheel of the motorcycle. Most motorcycles using a V-twin engine will have the engine mounted offset from a center line bisecting the lengthwise direction of the motorcycle. This is because the transmission, drive elements, chain and the like are necessarily mounted to one side of the motorcycle, hence, the engine should be offset in such as way as to balance the weight of the drive train on the motorcycle so that it will be balanced along the center line. This requires a slight offset of the engine. In a Harley-Davidson™ V-twin the engine is offset slightly to the right side of the motorcycle, as shown in FIG. 2. The right side V-twin deflector (10) is mounted directly above and adjacent to the engine cylinders, hence, it is exposed to engine heat and performs the greatest amount of heat deflection. The left side V-twin heat deflector (10A) shown in FIG. 3 still performs a heat deflection function for the motorcycle, but not as much heat from the engine cylinders (102, 104) is present on the left side of the motorcycle shown in FIG. 3. Nevertheless, most users will wish to have a left side heat deflector (10A) as well as a right side V-twin heat deflector (10). In addition to the heat deflection function of the left side heat deflector (10A) its appearance serves to balance and to make symmetrical the appearances of each side of the motorcycle. This is important to many motorcycle owners. As with the right side V-twin heat deflector (10), the left side heat deflector (10A) is a generally arcuate, flexible, malleable piece of heat-resistant material with generally curvilinear edges. The upper edge (15A) of the left side heat deflector (10A) again is adjacent to and runs along the seat (50) and below the gas tank (70). The lower edge (18A) at least partially covers the rear cylinder (102) although it is displaced from it somewhat, rather being directly over and adjacent to, the rear cylinder (102) as is the case with the right side V-twin heat deflector (10). The lower edge (18A) of the left side heat deflector (10A) curves downwardly from the gas tank (70) and extends backwardly toward the oil tank cover (60). It is generally above the inner primary cover (150). As with the right side heat deflector (10), the left side heat deflector (10A) will ordinarily be covered with vinyl or leather-like material and will have decorative studs so that the appearance of the left side heat deflector (16) matches the overall appearance of the motorcycle and usually will match the covering material of the seat (50). Decorative studs may be attached along the edges of the left side heat deflector (10A). It will attach to the motorcycle generally by means of holes drilled in the frame of the motorcycle matched with corresponding holes on the left side heat deflector (10A) although other mounting means could be used including an industrial grade hook-and-eye material known by the trade name Velcro®.

It will be understood that the foregoing description of the best mode for practicing the invention is by way of illustration and not limitation. Details of construction may be varied by one of skill in the art without departing from the spirit of the invention. The only limitations are in the claims which follow.

I claim:

1. A heat deflector in combination with a definite design motorcycle having a air cooled V-twin of at least 500 cubic centimeters volume with a first cylinder proximal to a front pivoting wheel of said definite motorcycle and a second cylinder proximal to a rear drive wheel of said definite design motorcycle engine comprising:
   (a) a heat deflector of a generally arcuate curvelinear shape having a first edge of said heat deflector shaped to match a definite shape motorcycle seat;
   (b) a second edge of said heat deflector shaped to match a definite shape motorcycle gas tank;
   (c) at least a portion of said heat deflector mounted over and above at least a portion of said second cylinder of said air cooled V-twin motorcycle engine, said second cylinder distal from said front pivoting wheel for said definite design of motorcycle and proximal to said rear drive wheel of said definite design motorcycle;
   whereby heat generated by said air cooled V-twin engine is deflected away from structures on said definite design motorcycle mounted proximal to said rear drive wheel of said definite desing motorcycle.

2. A heat deflector in combination with a definite design motorcycle having a air cooled V-twin of at least 500 cubic centimeters volume with a first cylinder proximal to a front pivoting wheel of said definite motorcycle and a second cylinder proximal to a rear drive wheel of said definite design motorcycle engine of claim 1 wherein said first edge is mounted adjacent to said motorcycle seat whereby said first edge appears seamlessly abutted against said motorcycle seat.

3. A heat deflector in combination with a definite design motorcycle having a air cooled V-twin of at least 500 cubic centimeters volume with a first cylinder proximal to a front pivoting wheel of said definite motorcycle and a second cylinder proximal to a rear drive wheel of said definite design motorcycle engine of claim 2 wherein said second edge of said heat deflector is mounted adjacent to said definite shape motorcycle gas tank whereby said second edge appears seamlessly abutted against said motorcycle gas tank.

4. A heat deflector in combination with a definite design motorcycle having a air cooled V-twin of at least 500 cubic centimeters volume with a first cylinder proximal to a front pivoting wheel of said definite motorcycle and a second cylinder proximal to a rear drive wheel of said definite design motorcycle engine of claim 3 wherein said heat deflector has a definite appearance, said definite appearance to match said motorcycle seat whereby the overall visual appearance of said definite motorcycle is enhanced by said heat deflector.

5. A heat deflector in combination with a definete design motorcycle having an air cooled V-twin engine at least 500 cubic centimeters volume with a first cylinder proximal to a front pivoting wheel of said definite motorcycle and a second cylinder proximal to a rear drive wheel of said definite design motorcycle said definite design motorcycle manufactured by Harley-Davidson Motorcycle Company, for deflecting hot air generated by the said air cooled V-twin engine when in use comprising:
   (a) a heat deflector of a generally arcuate curvilinear shape having a first edge of said heat deflector shaped to match a definite motorcycle seat on said definite design motorcycle having an air cooled V-twin engine;
   (b) a second edge of said heat deflector shaped to match a definite motorcycle gas tank on said definite desing motorcycle having an air cooled V-twin engine;
   (c) at least a portion of said heat deflector mounted over and above said second cylinder of said air cooled V-twin motorcycle engine, said second cylinder distal from front pivoting wheel for said definite desing motorcycle and proximal to said read drive wheel of said definite desing motorcycle;
   whereby heat generated by said air cooled V-twin engine is deflected away from structures on said definite desgin motorcycle mounted proximal to said rear drive wheel of said definite design motorcycle.

6. A heat deflector in combination with a definite design motorcycle having an air cooled V-twin engine of at least 500 cubic centimeters volume with a first cylinder proximal to a front pivoting wheel of said definite motorcycle and a second cylinder proximal to a rear drive wheel of said definite design motorcycle, said definite design motorcycle manufactured by Harley-Davidson Motorcycle Company, for deflecting hot air generated by the said air cooled V-twin engine when in use of claim 5 wherein said first edge is mounted adjacent to said definite motorcycle seat whereby said first edge appears seamlessly abutted against said definite motorcycle seat.

7. A heat deflector in combination with a definite design motorcycle having an air cooled V-twin engine of at least 500 cubic centimeters volume with a first cylinder proximal to a front pivoting wheel of said definite motorcycle and a second cylinder proximal to a rear drive wheel of said definite design motorcycle, said definite design motorcycle manufactured by Harley-Davidson Motorcycle Conpany, for deflecting hot air generated by said air cooled V-twin engine when in use of claim 6 wherein said second edge of said heat deflector is mounted adjacent to said definite motorcycle gas tank whereby said second edge appears seamlessly abutted against said definite motorcycle gas tank.

8. A heat deflector in combination with a definite design motorcycle having an air cooled V-twin engine of at least 500 cubic centimeters volume with a first cylinder proximal to a front pivoting wheel of said definite motorcycle and a second cylinder proximal to a rear drive wheel of said definite design motorcycle, said definite design motorcycle manufactured by Harley-Davidson Motorcycle Company, for deflecting hot air generated by said air cooled V-twin engine when in use of claim 7 wherein said heat deflector has a definite appearance, said definite appearance to match said definite motorcycle seat whereby the overall visual appearance of said definite design motorcycle is enhanced by said heat deflector.

\* \* \* \* \*